United States Patent [19]
Bate et al.

[11] Patent Number: 6,151,538
[45] Date of Patent: Nov. 21, 2000

[54] CONTROL SYSTEM

[75] Inventors: Iain Bate; Alan Burns, both of York, United Kingdom

[73] Assignee: Rolls-Royce plc, London, United Kingdom

[21] Appl. No.: 09/081,065

[22] Filed: May 19, 1998

[30]        Foreign Application Priority Data

May 23, 1997 [GB] United Kingdom .................. 9710522

[51] Int. Cl.$^7$ .............................. G06F 17/00; G06F 7/00
[52] U.S. Cl. .................................. 701/3; 701/33; 701/66; 709/100; 709/107
[58] Field of Search .................................. 701/33, 66, 1, 701/3; 709/1, 100, 102, 107

[56]            References Cited

U.S. PATENT DOCUMENTS

| | | | |
|---|---|---|---|
| 5,553,280 | 9/1996 | Fortier ........................................ | 707/10 |
| 5,606,695 | 2/1997 | Dworzecki . | |
| 5,748,468 | 5/1998 | Notenboom et al. ........................ | 700/3 |

FOREIGN PATENT DOCUMENTS

| | | |
|---|---|---|
| 0697657 | 2/1996 | European Pat. Off. . |
| 92/17796 | 10/1992 | WIPO . |

*Primary Examiner*—William A. Cuchlinski, Jr.
*Assistant Examiner*—Gertrude Arthur
*Attorney, Agent, or Firm*—W. Warren Taltavull; Farkas & Manelli PLLC

[57]            ABSTRACT

A hybrid control system executes tasks within a transaction which is executed in a given order. The order in which the tasks are executed is inversely proportional to their deadlines. The deadlines are assigned an initial deadline D, an initial maximum end-to-end delay of the transaction is calculated using the initial deadlines D and the given order of the tasks.

The deadline of the task with the largest deadline is reduced by an increment to give a new deadline and if the task following it has an increment to give a new deadline. A new end-to-end delay is calculated using the new deadlines and the given order of the tasks. These steps are repeated until the new end-to-end delay does not exceed the desired maximum end-to-end delay.

6 Claims, 3 Drawing Sheets

CONTROL SYSTEM

FIELD OF THE INVENTION

The invention relates to a hybrid computer implemented control system, particularly a safety critical hybrid control system such as that used in an aircraft controller.

BACKGROUND OF THE INVENTION

Hybrid control systems are control systems involving both computer hardware and software as wall as other types of hardware such as sensors. An aircraft engine controller, for example, takes inputs such as engine speed, temperature and pressure; processes this information; and them provides outputs for controlling the operation of the engine, such as a signal indicating that more or less fuel is required. It is necessary for such a control system to execute various steps at set frequencies and in a particular order. For example, the above control system might input a pressure value, carry out a first processing step on that pressure value and carry out a second processing step on the results of the first processing step, before finally outputting a command to the engine depending on the results of the processing steps. It might then be necessary to repeat this whole sequence at a regular fixed interval. The steps in this sequence must execute at the correct frequencies and in the correct order to ensure that the engine is controlled in the desired manner.

Before discussing the way in which the steps of such a sequence are controlled, it is helpful to define various terms which are used in relation to the control system software.

1. A task is a functional unit within the control software, this unit being responsible for a particular step in a sequence of steps. For instance a task might relate to the reading of a pressure value, or the processing of such a value once read.

2. Each task has attributes associated with it, including:
   a) its deadline, which is the time within which the task must be completed;
   b) its priority, which defines when the task must be executed in relation to other tasks;
   c) its period, which is used in the conventional sense for a task having a particular frequency; and
   d) its jitter constraint, which determines the variation allowed from precise periodicity.

3. An ordered list of tasks to be executed is referred to as a transaction. Within the transaction, tasks may have precedence, ie task A must occur before task B. Further, the entire transaction may have a maximum end-to-end delay, within which time all tasks within the transaction must complete.

Currently, the processing of such tasks within safety critical control systems tends to be carried out using so-called 'cyclic executives'. The cyclic executive invokes a series of tasks in a fixed order, then repeats this task list at a specific rate called its cycle, or its major cycle in the common situation in which all tasks do not execute at the same frequency. When the frequencies are not identical, the tasks list defines a sequence such that each task is repeated sufficiently often that its frequency requirement is met. In this case, the execution of each individual task or group of tasks with the same period is called a minor cycle, and the frequency of the major cycle will be set to the least common multiple of the frequencies of each task. See the Paper by C Douglass Locke 'Software Architecture for Hard Real Time Applications: Cyclic Executives -v- Fixed Priority Executives'. Cyclic executive scheduling has certain drawbacks, most importantly that any changes to the system are very difficult to implement. For example, the addition of a further sensor to a control system might require modification of the whole processing arrangement (see the above Paper).

An alternative to the cyclic executive approach is that of using 'fixed priority scheduling', wherein tasks are executed in order of their priority. The normal approach for assigning priorities is referred to as the 'deadline monotonic policy'. This involves assigning priorities such that highest priority is given to tasks with the shortest deadlines.

Fixed priority scheduling has not previously been used extensively in real systems. Although much academic work has been carried out, it has often been performed with a set of given deadlines. Priorities are then assigned according to these given deadlines, and the tasks are carried out in order of decreasing priority. This does not address the initial problem of assigning deadlines to tasks. This invention deals particularly with that problem.

A common approach to priority assignment is to make the deadline for a particular task equal to its period. Thus, if a task is required to execute every 50 ms, the fundamental deadline by which each invocation of the task must execute is the earliest time at which the next invocation of the task may commence execution. However, for a complex set of system requirements, this simple approach is insufficient because it is necessary to take into account at least the following factors: jitter constraints, when for some tasks only a limited variation from precise periodicity is allowed; precedence, when for example task B must execute after task A, even if its period is longer; and end-to-end transaction delay requirements, when the maximum permitted time within which all tasks with a particular transaction must execute is limited.

SUMMARY OF THE INVENTION

According to one aspect of the invention there is provided a hybrid control system including means for executing tasks within a transaction, where:

the tasks within the transaction must be executed in a given order and within given deadlines;

the order in which the tasks are executed once they are released is inversely proportional to their deadlines;

the transaction must be executed with a desired maximum end-to-end delay; and the deadlines used by the control system have been assigned in the following way:

i) each task is assigned an initial deadline D;

ii) an initial maximum end-to-end delay of the transaction is calculated using the initial deadlines D and the given order of the tasks;

iii) if the initial maximum end-to-end delay exceeds :he desired maximum end-to-end delay:

a) the deadline of the task with the longest deadline is reduced by an increment to give a new deadline;

b) for each task, if the task following it has an equivalent deadline, its deadline is reduced by an increment to give a new deadline;

c) a new end-to-end delay is calculated using the new deadlines and the given order of the tasks; and d) steps a) to c) are repeated until the new end-to-end delay does not exceed the desired maximum end-to-end delay.

The increment may be one clock cycle of the control system.

Preferably the initial deadline D initially assigned to a task is:

for a task with no jitter constraints, deadline D=period, T; and for a task with a jitter constraint, deadline D=J+BCET;

where BCET is the best case execution time of the task; and J is the maximum allowed variation from true periodicity of the time at which the task completes.

Once the initial deadlines have been assigned, preferably as above, the initial maximum end-to-end delay is worked out using these deadlines, and the known order in which the tasks must execute. For example, if a task A has a deadline of 100 ms and task B has a deadline of 50 ms, but task B must execute after task A, the initial maximum end-to-end delay will be 150 ms. This is because 3 invocations of task B (50 ms) are necessary to ensure that one of them takes place after task A.

Subsequent new end-to-end delays are worked out from the new deadlines in a similar way.

The tasks which are to execute within a transaction may all be released at the same time, in which case tasks with the shortest deadlines will always execute first. This can cause difficulties where, for example, a task which is scheduled to execute last in the transaction has a very short deadline, for example due to a jitter constraint. In these circumstances, this task may be given an off-set, whereby it is released later than the other tasks within the transaction. It can thereby be given a short deadline, without forcing the other tasks to be given even shorter deadlines in order to maintain the correct precedence.

The hybrid control system according to the invention ensures the proper and timely execution of tasks such as checking temperature and pressure values in an engine, and producing a resultant signal, for instance to supply more or less fuel to the engine.

DETAILED DESCRIPTION OF THE INVENTION

Figure 1:
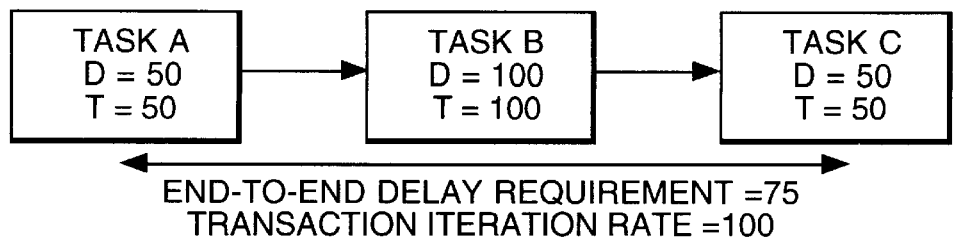
FIG. 1 is a diagram showing three tasks which must be executed in a particular order.

Consider the three tasks shown in FIG. 1. Task A executes every 50 ms, and must execute before task B. Task B executes every 100 ms and must execute before task C, and task C must execute every 50 ms. The required maximum end-to-end delay is 75 ms.

Figure 2:
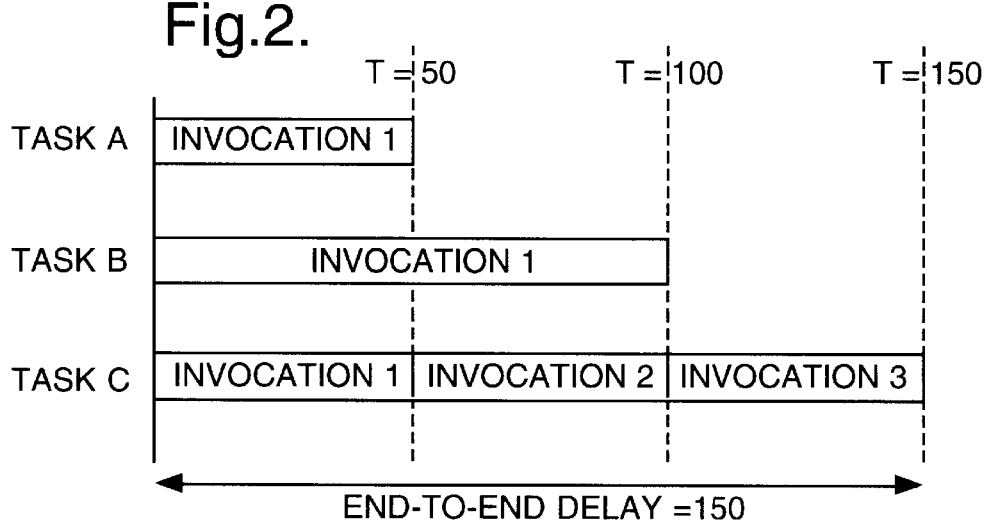
FIG. 2 is a diagram showing the times at which the various tasks may be executed, using the initial deadlines assigned to the tasks.

Using the basic approach to priority assignments, making period equal to deadline, gives a transaction as illustrated in FIG. 2. Three invocations of task C are necessary to ensure that one of them executes after task B. This transaction has a total end-to-end delay of 150 ms, which is more than the maximum end-to-end delay required (75 ms). Therefore, it is clear that the deadlines must be reduced, although the aim is always to reduce them as little as possible, so as to make implementation as easy as possible.

Task B has the longest initial deadline so its deadline is reduced incrementally.

Figure 3:
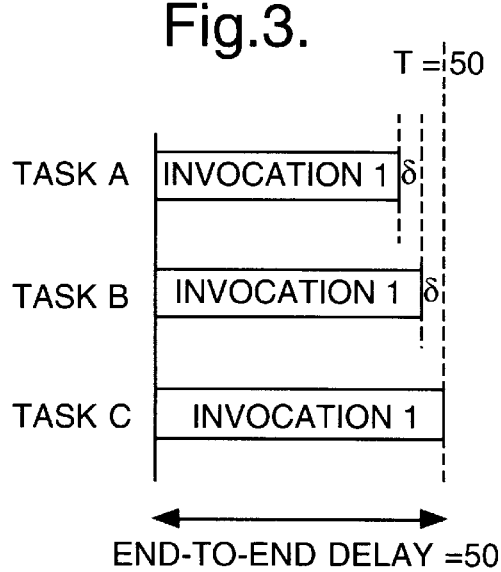
FIG. 3 is a diagram showing the times at which the various tasks may be executed, using deadlines assigned according to the invention.

The deadlines of all tasks are reduced if they ever correspond to the deadline of the task following them. Thus, once the deadline of task B is reduced to 50 ms, the deadline of task A is reduced to 50−δms. In addition at this point task B has an equivalent deadline to the task following it (task C), so its deadline is reduced to 50−δms. This in turn results in the deadline of task A having to be reduced further to 50−2 δms. Eventually the precedence and end-to-end delay requirements are met as shown in FIG. 3.

If task A, for example, had a jitter constraint, its deadline might be reduced further, to J plus BCET, where J is allowed variation from precise periodicity and BCET is the best case execution time. When there is no jitter constraint the execution times of the tasks are usually sufficiently short that they can be assumed to be negligible.

Figure 4:
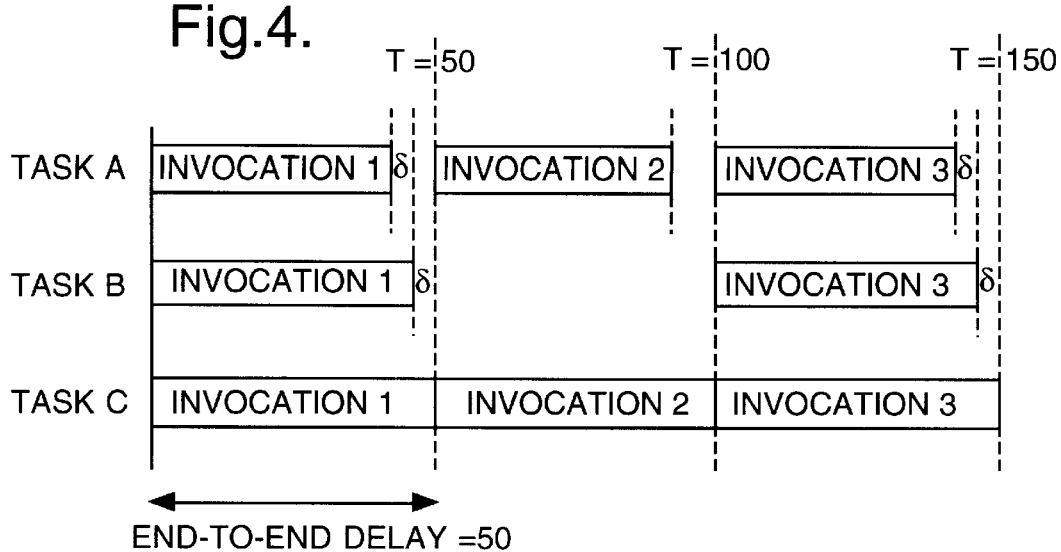
FIG. 4 is similar to FIG. 3, but shows a further 100 milliseconds.

FIG. 4 shows what happens next. Tasks A and C are released again at t=50, because they each have a period of 50 ms. Task A has a deadline of 50−2 δms, so executes before task C, which has a deadline of 50 ms. At t=100, tasks A and C are released once more, and task B is also released, because it has a period of 100 ms. Task A again executes first because it has the shortest deadline, 50−2 δms, task B executes next because it has the next shortest deadline, 50−δms, and task C executes last. This sequence is repeated as necessary.

Figure 5:
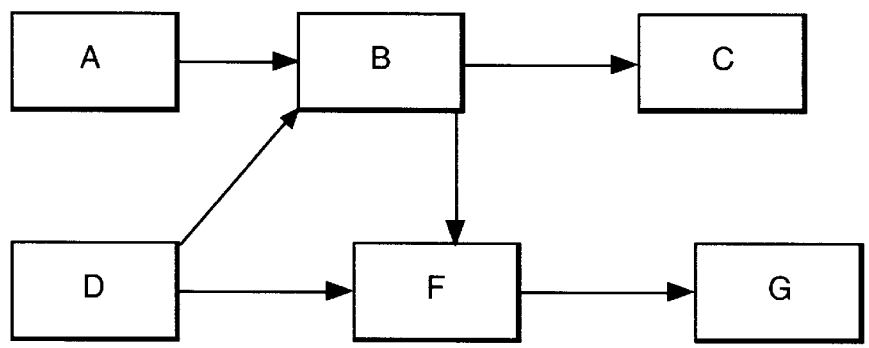
FIG. 5 shows schematically a series of inter-related tasks which must execute in a specific order.

FIG. 5 shows schematically a set of inter-related tasks, which must execute in a particular order, within an end-to-end delay of 50 ms. Task G is executed last, and is therefore initially assigned a deadline of 50 ms. It is clear that task F must have a deadline of not more than 50−δms, and task D a deadline of not more than 50−2 δms.

Task C is also executed last, so is initially assigned a deadline of 50 ms. This means that task B must have a deadline of not more than x−δms and task A a deadline of not more than x−2 δms. However, referring to the Figure, task B must also execute before task F, and task D must also execute before task B. Therefore the deadline of task B must be reduced to x−2 δms, and the deadlines of tasks A and D to x−3 δms. It is necessary to work through all possible pathways until the deadlines do not reduce any further for one complete cycle.

Figure 6:
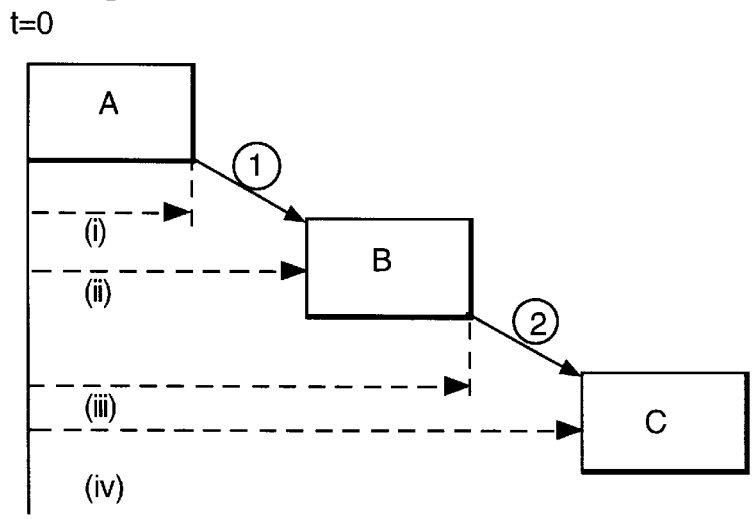
FIG. 6 illustrates the use of offsets.

In the above analysis, it has been assumed that a task which is to execute last in a transaction must be given the longest deadline, to ensure that transaction precedence is met. However, as an alternative, it is possible to use 'off-sets' to achieve this effect. By using off-sets, tasks within a transaction may be released at different times, as shown in FIG. 6. This Figure shows a task A which must execute first, so that its output may be delivered, by a message 1, to a task B before task B can execute. Similarly, task b must execute before a message 2 delivers its output to a task C which must execute last.

By using off-sets i) and iv) for the tasks A to C and messages 1 and 2, the transaction can be made to execute correctly.

Off-sets can be used advantageously in a situation where a task which is scheduled last within a transaction has a short deadline, for example due to a jitter constraint. Take the following example:

task A has an initial deadline of 100 ms;

task B has an initial deadline of 100 ms, and must execute after task A; and task C has an initial deadline of 10 ms due to a jitter constraint, and must execute after task B.

Without using off-sets, the deadline assigned would be:

A=10–2 δms

B=10–δms

C=10 ms

To avoid the use of such short deadlines, task C could be given an off-set, so that it is released, i.e. performed, when tasks A and B are completed. For example, tasks A and B could be given deadlines of 40–δms and 40 ms, respectively, and task C given an offset of 40 ms and a deadline of 50 ms, from the beginning of the transaction. Thus, the deadline of C for the purpose of priority is 50 ms.

Figure 7:
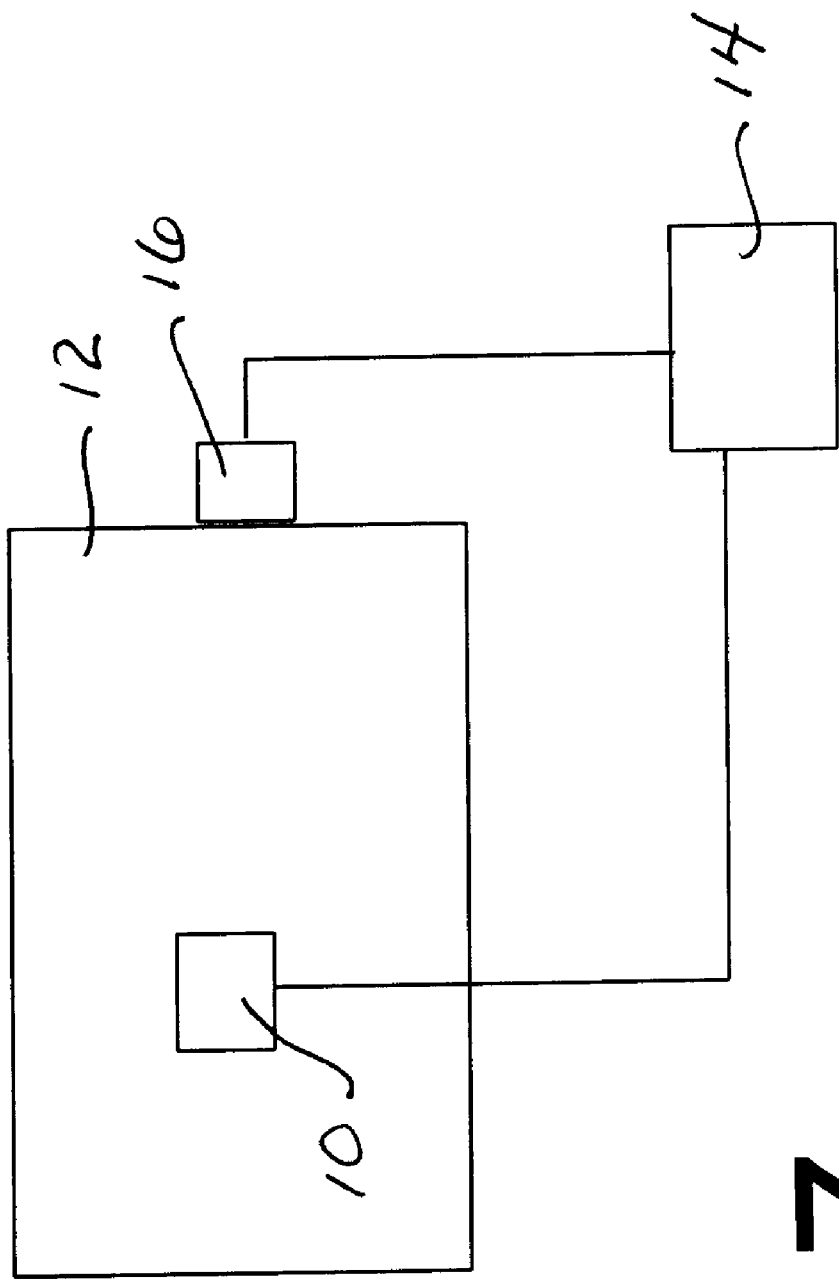
FIG. 7 is a schematic illustration of a setup for monitoring an engine variable is shown.

It will be appreciated that the system of this invention may be run on conventional and commercially available computers with any modifications required by the environment in which the system is to be operated. For example, as shown in FIG. 7, a schematic view of a setup for monitoring an engine variable is shown where a sensor 10 is appropriately disposed in a engine 12 and connected by a cable to an input device linked to a computer 14. The computer 14 may be connected to a regulator such a fuel pump 16. Other sensors (not shown) will be used in the engine 12 and linked to the computer 14. The tasks carried out by the sensor and any associated functions will be carried out according to the invention.

We claim:

1. A computer implemented control system for executing tasks within a transaction, wherein:

the tasks within the transaction must be executed in a given order and within given deadlines;

the order in which the tasks are executed once they are released is inversely proportional to their deadlines;

the transaction must be executed within a desired maximum end-to-end delay; and the deadlines used by the control system have been assigned in the following way:

i) each task is assigned an initial deadline D;

ii) an initial maximum end-to-end delay of the transaction is calculated using the initial deadlines D and the given order of the tasks;

iii) if the initial maximum end-to-end delay exceeds the desired maximum end-to-end delay;

a) the deadline of the task with the longest deadline is reduced by an increment to give a new deadline;

b) for each task, if the task following has an equivalent deadline, its deadline is reduced by an increment to give a new deadline;

c) a new end-to-end delay is calculated using the new deadlines and the given order of the tasks; and d) steps a) to c) are repeated until the new end-to-end delay does not exceed the desired maximum end-to-end delay.

2. A control system according to claim 1 wherein the initial deadline D for a task with no jitter constraint is equal to the period of the task, T.

3. A control system according to claim 1 wherein the initial deadline D for a task with a jitter constraint is equal to J plus BCET, where J is the maximum allowed variation from true periodicity of the time at which the task completes and where BCET is the best case execution time.

4. A control system according to claim 1, wherein the increment of stem iv) is equal to one clock cycle of the control system.

5. A control system according to claim 1 wherein a task in the transaction is given an off-set so that it is released later than other tasks within the transaction.

6. A control system as claimed in claim 1 wherein said control system is used in an aircraft engine controller.

* * * * *